April 8, 1958     R. L. SMITH     2,829,658

MEANS FOR CLEANING PHONOGRAPH RECORDS

Filed April 6, 1954

INVENTOR.
ROBERT L. SMITH

BY

ATTORNEY

United States Patent Office 2,829,658
Patented Apr. 8, 1958

2,829,658

MEANS FOR CLEANING PHONOGRAPH RECORDS

Robert L. Smith, Mount Vernon, N. Y.

Application April 6, 1954, Serial No. 421,359

1 Claim. (Cl. 134—195)

This invention relates to new and useful improvements in means for cleaning records, such as phonograph records.

It is a well known fact that such cleaning has hitherto been done by lifting a record from its support and then cleaning and polishing said record with a rag, or the like, while holding the record by the hand.

The present device provides a much improved manner of cleaning such record, as the latter may be left on its support, while a suitable cleaning fluid is sprayed on the record, while this at the same time is gone over with a soft piece of material.

It is understood that any suitable material may be used for making the device.

Figure 1:
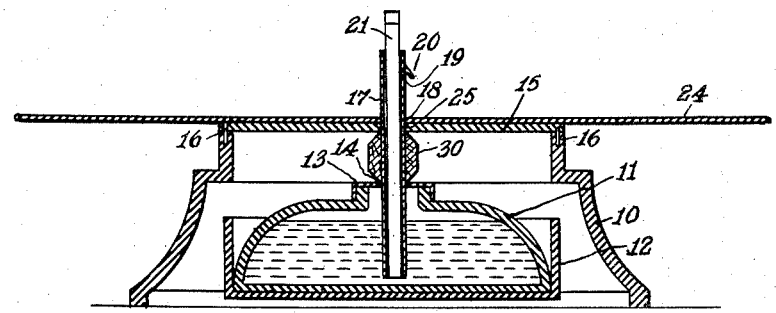
Figure 2:
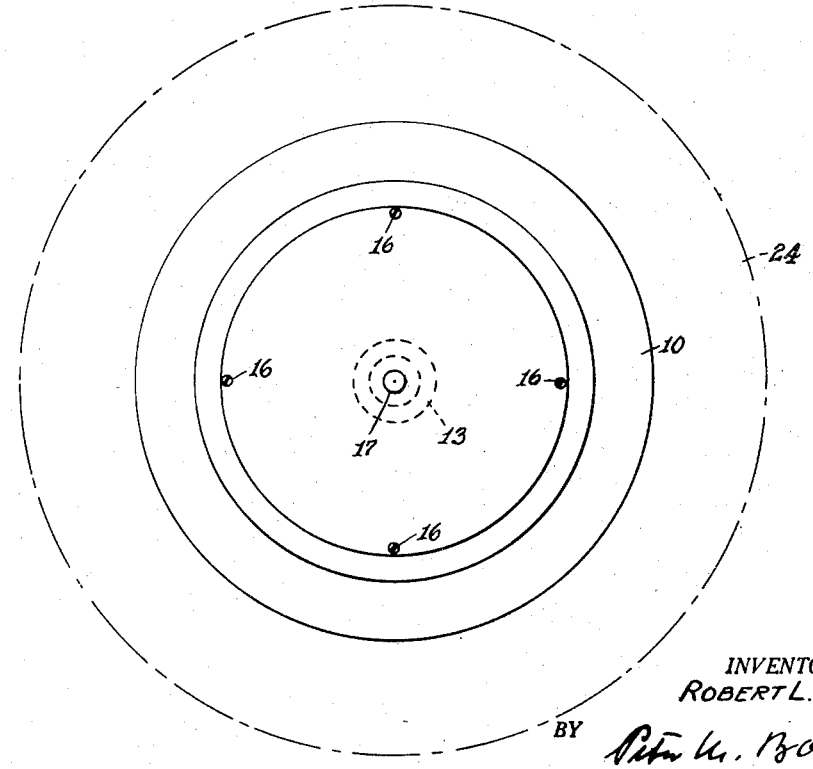

With the above in view, this invention consists of the novel features of construction, combination and arrangement of parts, hereinafter fully described and illustrated in the accompanying drawing, forming part of this specification, and in which similar characters of reference indicate corresponding parts in all views, and in which:

Figure 1 is a transverse sectional view of my device, with a phonograph record mounted thereon; while Figure 2 is a top plan view of the same.

Referring more particularly to the drawing, the numeral 10 indicates a casing in which is arranged a container 11 having a suitable fluid, or liquid, for cleaning records; said container is positioned in an enclosure 12 within said casing. A lid 13, formed with a hole 14 therein, closes the container 11.

The casing is at its top formed with a cover 15 secured to said casing by screws 16.

A phonograph record 24 is shown at the top of said cover 15.

The record is mounted on a hollow tube 17 extending through the conventional opening 18 in the record, through an opening 25 in the cover 15 and through the opening 14 in the lid 13.

While any suitable spraying arrangement, such as for instance perfume sprayers, may be applied in connection with this device, if adapted for use as to size and shape, there is herein shown a liquid spraying apparatus, which embodies the aforesaid hollow tube 17 that is formed with a small orifice 19 and a tiny downwardly projecting lip 20 above said orifice in order to force the liquid spray from the orifice down onto the record 24 below.

A plunger 21 is mounted in said hollow tube 17 but spaced slightly apart from the latter. The plunger extends way down in said tube, which, in turn, is mounted in the liquid container 11.

The said container, cover 13 and the section of the tube 17 adjacent cover 13 form an air-tight enclosure.

A hollow member 30 made of wood and arranged between the openings 25 and 14 and surrounding the tube 17, serves no purpose except filling in the space between said openings.

Upon operating or pushing the plunger 21 downward, the said plunger will draw liquid from the container up in the tube 17 to be discharged through the orifice 19, and said liquid will subsequently due to the downwardly extending lip 20 be directed to the record 24 for use in cleaning the latter.

The plunger 21 and tube 17 consist of one unit that may be removed from the casing together with the lid 13, which is fixedly secured to the tube 17 in any convenient manner.

It is obvious that changes may be made in the form, construction and arrangement of parts, as shown, within the scope of the appended claim, without departing from the spirit of the invention, and I do not, therefore, wish to limit myself to the exact construction shown and described herein.

What I claim as new, and desire to secure by Letters Patent of the United States, is:

In a device of the class described, a casing, an enclosure within the latter, a container with liquid arranged in said enclosure, a lid having an opening and being mounted upon said container, a cover having a central opening and being secured to said casing, a tube arranged through said openings and extending down into the liquid container, said tube being formed with an opening above the cover, a downwardly slanting lip portion above said opening, and a plunger disposed in said tube and spaced slightly apart from the inner wall of the latter, said plunger being adapted to discharge liquid through said last opening down upon a record mounted on the cover surrounding said tube.

References Cited in the file of this patent

UNITED STATES PATENTS

| | | |
|---|---|---|
| 1,039,794 | Perew | Oct. 1, 1912 |
| 1,900,255 | Ormsbee | Mar. 7, 1933 |
| 2,570,021 | Beach | Oct. 2, 1951 |
| 2,646,585 | Whittington | July 28, 1953 |
| 2,702,147 | Brown | Feb. 15, 1955 |